United States Patent
Vasseur et al.

(10) Patent No.: US 11,258,673 B2
(45) Date of Patent: Feb. 22, 2022

(54) MACHINE LEARNING DRIVEN DATA COLLECTION OF HIGH-FREQUENCY NETWORK TELEMETRY FOR FAILURE PREDICTION

(71) Applicant: Cisco Technology, Inc., San Jose, CA (US)

(72) Inventors: Jean-Philippe Vasseur, Saint Martin D'uriage (FR); Grégory Mermoud, Veyras (CH); Vinay Kumar Kolar, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 185 days.

(21) Appl. No.: 16/402,384

(22) Filed: May 3, 2019

(65) Prior Publication Data
US 2020/0351173 A1 Nov. 5, 2020

(51) Int. Cl.
*H04L 12/24* (2006.01)
*G06N 20/00* (2019.01)
*H04L 29/08* (2006.01)

(52) U.S. Cl.
CPC ............ *H04L 41/16* (2013.01); *G06N 20/00* (2019.01); *H04L 41/0681* (2013.01); *H04L 41/0686* (2013.01); *H04L 41/147* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,946,980 B2 | 4/2018 | Anderson | |
| 10,862,805 B1* | 12/2020 | Dods | H04W 52/0258 |
| 2018/0007074 A1* | 1/2018 | Kune | G06F 21/56 |
| 2018/0210427 A1 | 7/2018 | Celia et al. | |
| 2018/0300124 A1 | 10/2018 | Malladi et al. | |
| 2019/0108888 A1* | 4/2019 | Sarkar | G11C 16/349 |
| 2020/0314022 A1* | 10/2020 | Vasseur | H04L 41/16 |

OTHER PUBLICATIONS

U.S. Appl. No. 16/402,384, Unpublished (filed May 3, 2019), Cisco Technology Inc.
Shawahna, et al., "FPGA-Based Accelerators of Deep Learning Networks for Learning and Classification: A Review", arxiv.org, Jan. 1, 2019, 41 pages.
Vietri et al., "Driving Cache Replacement with ML-Based Lecar", usenix.org, Apr. 10, 2019, 6 pages.

* cited by examiner

*Primary Examiner* — Mohammad S Adhami
(74) *Attorney, Agent, or Firm* — Behmke Innovation Group LLC; Kenneth J. Heywood; James J. Wong

(57) ABSTRACT

In one embodiment, a supervisory service for one or more networks receives telemetry data samples from a plurality of networking devices in the one or more networks. The service trains a failure prediction model to predict failures in the one or more networks, using a training dataset comprising the received telemetry data samples. The service assesses performance of the failure prediction model. The service trains, based on the assessed performance of the failure prediction model, a machine learning-based classification model to determine whether a networking device should send a particular telemetry data sample to the service. The service sends the machine learning-based classifier to one or more of the plurality of networking devices, to control which telemetry data samples the one or more networking devices send to the supervisory service.

20 Claims, 8 Drawing Sheets

MACHINE LEARNING DRIVEN DATA COLLECTION OF HIGH-FREQUENCY NETWORK TELEMETRY FOR FAILURE PREDICTION

TECHNICAL FIELD

The present disclosure relates generally to computer networks, and, more particularly, to machine learning driven data collection of high-frequency network telemetry for failure prediction.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection in an SD-WAN now becomes possible through the use of machine learning techniques. However, using machine learning to predict failures is contingent on the proper collection of high-frequency telemetry data for purposes of model training. Unfortunately, the volume of telemetry data needed for model training can be quite burdensome on the network infrastructure, both from a traffic standpoint and from a device resource standpoint.

DESCRIPTION OF EXAMPLE EMBODIMENTS

Overview

Figure 1A:
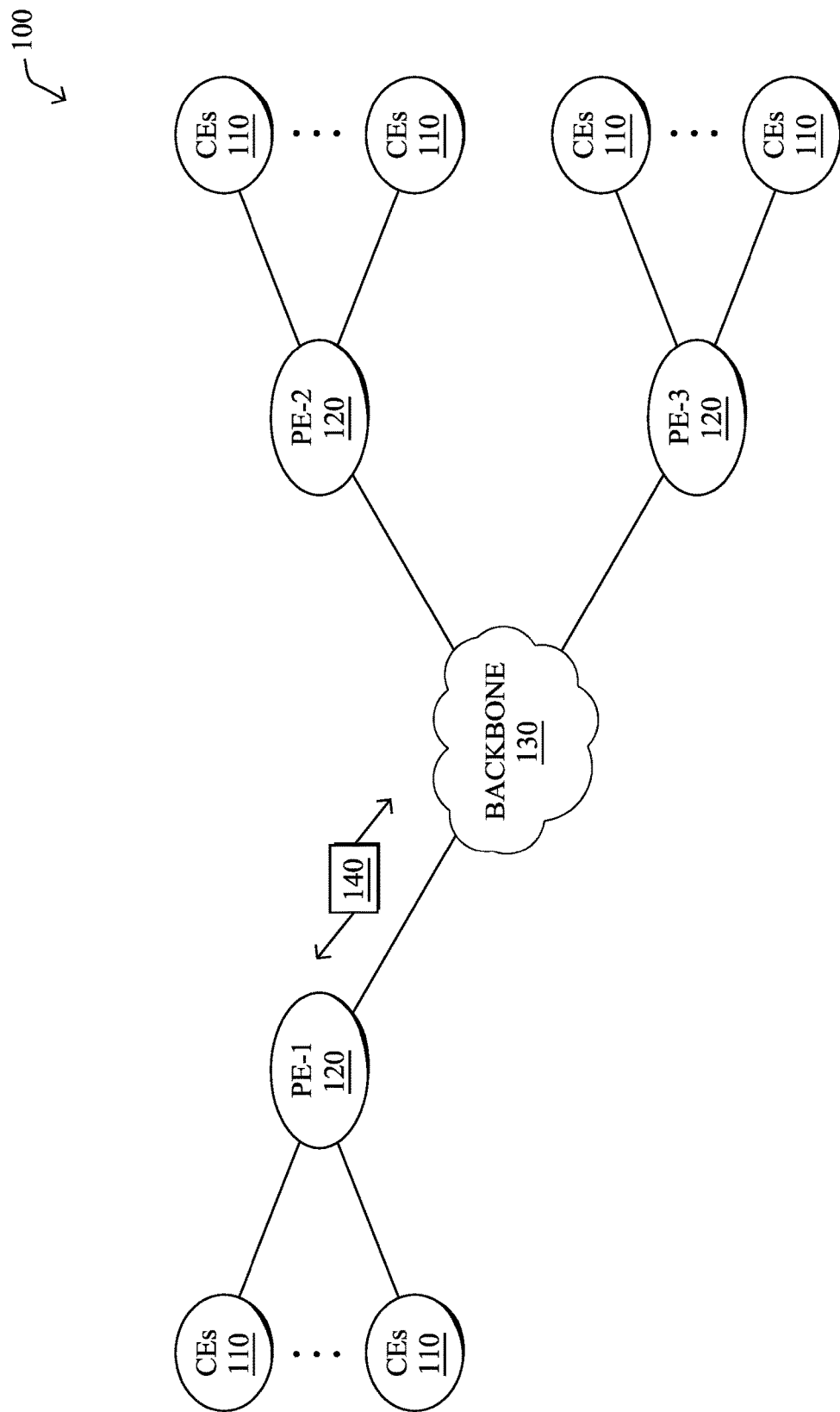
FIGS. 1A-1B illustrate an example communication network.

According to one or more embodiments of the disclosure, a supervisory service for one or more networks receives telemetry data samples from a plurality of networking devices in the one or more networks. The service trains a failure prediction model to predict failures in the one or more networks, using a training dataset comprising the received telemetry data samples. The service assesses performance of the failure prediction model. The service trains, based on the assessed performance of the failure prediction model, a machine learning-based classification model to determine whether a networking device should send a particular telemetry data sample to the service. The service sends the machine learning-based classifier to one or more of the plurality of networking devices, to control which telemetry data samples the one or more networking devices send to the supervisory service.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
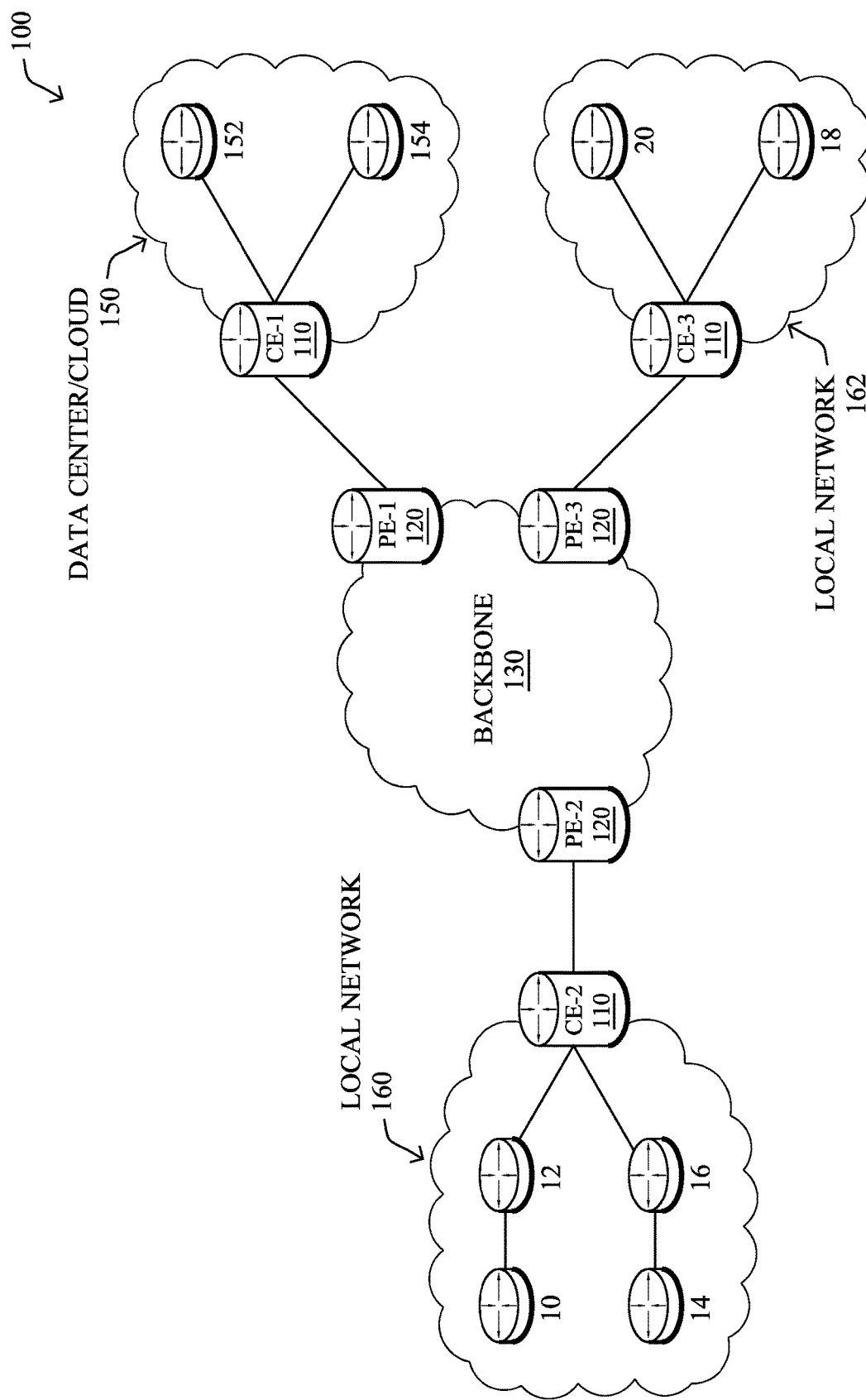

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
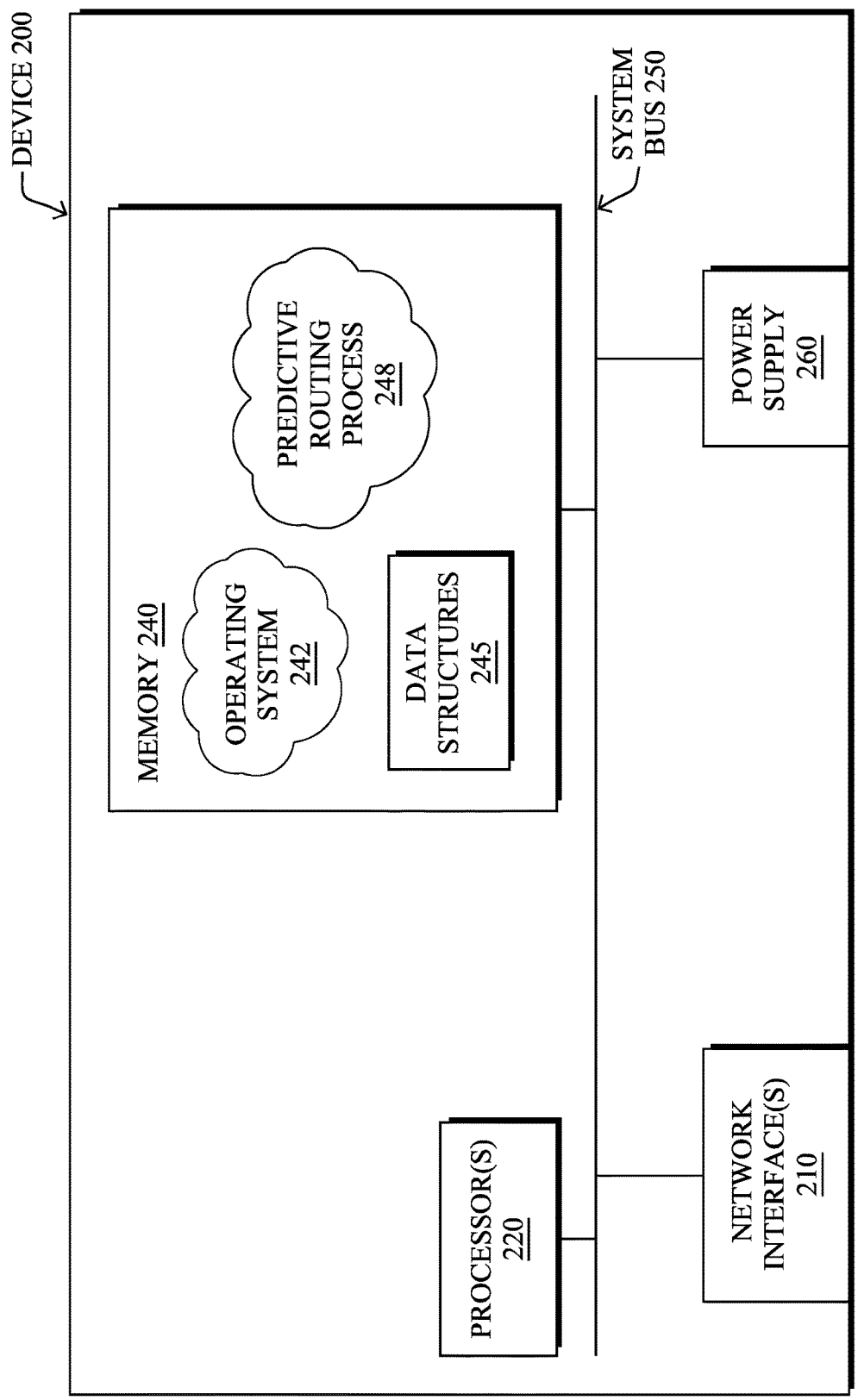
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process (services) 248 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, predictive routing process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 may also include computer executable instructions that, when executed by processor(s) 220, cause device 200 to predict failures of network elements in the network (e.g., a link or node/device), thereby allowing device 200 to proactively reroute traffic to avoid the failed element. To do so, in some embodiments, predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of a network element failure, such as failure of a link or node/device, or indicative of normal operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a network element will fail. Conversely, the false negatives of the model may refer to the number of times the model predicted normal network element operations, when the network element actually fails. True negatives and positives may refer to the number of times the model correctly predicted whether a network element will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (ISIS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
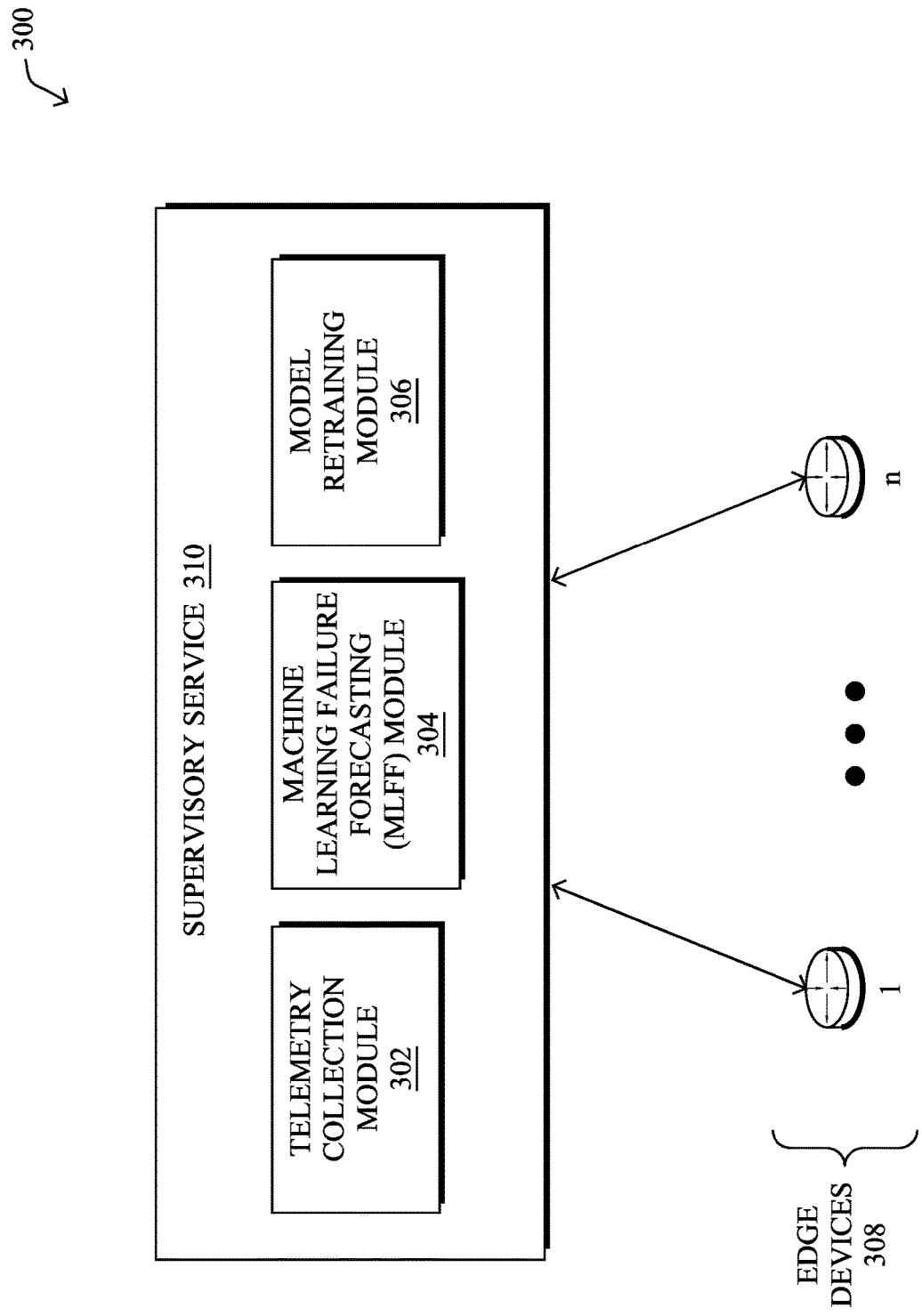
FIG. 3 illustrates an example architecture for predicting failures in a network.

FIG. 3 illustrates an example architecture 300 for predicting failures in network, according to various embodiments. In general, architecture 300 may include a supervisory service 310 located in the cloud or implemented locally in the network under scrutiny, such as a supervisory service for an SD-WAN. As shown, supervisory service 310 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

Supervisory service 310 may be in communication with any number of devices 308 (e.g., a first through $n^{th}$ device), which may be CE routers 110 and/or PE routers 120, described previously, or other forms of networking devices configured to convey traffic through the network. In various embodiments, devices 308 may be part of the same SD-WAN or, in cases in which supervisory service 310 is implemented as a cloud-based service, part of any number of different SD-WANs or other networks.

In general, there are many circumstances in a network that can lead to failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure or a failure of a network element supporting the tunnel. It is expected that some failures are predictable (i.e., there exist early signs of an upcoming failure) while others will not be non predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the device 308 involved and may be localized to the core of the service provider network (e.g., the underlying IP, 4G, 5G, etc. network), in which case the failure is non-predicable from the perspective of the device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from devices 308, supervisory service 310 may send a custom request to one or more of devices 308 with the objective of obtaining the list of events of interest along with the set of candidate telemetry variables with potential predictive power to predict failures. In further embodiments, devices 308 may instead provide the telemetry data to supervisory service 310 on a push basis (e.g., without service 310 first requesting the telemetry data).

In various embodiments, telemetry collection module 302 may adjust the set of telemetry variables/parameters obtained from the device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that devices 308 measure and send these variables to supervisory service 310 periodically, since real-time variations of such telemetry is needed for forecasting failure events. For example, based on the above conclusion, MLFF module 304 may determine that the CPU and memory utilizations of one or more networking devices that support a given tunnel should be sent periodically (e.g., every 1 second) by devices 308.

Other telemetry variables, such as during a rekey failure when a device 308 is not able to successfully exchange the security keys with the controller, may also be requested to be sent to supervisory service 310, on occurrence of the event. Since such events are rare and the states of the variables remain the same for longer periods of time, telemetry collection module 302 may request an event-based push request, rather than periodic messages. In other words, telemetry collection module 302 may instruct one or more of devices 308 to report certain telemetry variables only after occurrence of certain events. For example, Table 1 below shows some example telemetry variables and when a device 308 may report them to supervisory service 310:

TABLE 1

| Relevant Telemetry | Request Type |
| --- | --- |
| Memory_utilization | Requested from head and tail edge routers. |
| CPU Utilization | Periodically once every 1 second. |
| BFD Probe Latency, Loss and Jitter | |
| Queue statistics (%-age drops for different queues) | |

TABLE 1-continued

| Relevant Telemetry | Request Type |
| --- | --- |
| Interface down event | Requested from both head and tail edge routers |
| Rekey exchange failure | |
| Router crash logs | Upon event occurrence. |

In a further embodiment, MLFF module 304 may also attempt to optimize the load imposed on the device(s) 308 reporting the telemetry variables to supervisory service 310. For example, MLFF module 304 may determine that the CPU and memory usages should be measured and reported every minute to supervisory service 310.

A key functionality of MLFF module 304 is to train any number of machine learning-based models to predict network element failures. Preferably, the models are time-series models trained centrally (e.g., in the cloud) using the telemetry collected by telemetry collection module 302. In one instantiation of MLFF module 304, the models may be trained on a per network instance or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-network/SD-WAN, and global (multiple SD-WAN) approaches to model training. For example, MLFF module 304 may start with the least granular approach (e.g., a global model across all networks/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding device(s) 308 listing the set of variables along with their sampling/reporting frequencies. Note that sampling is a dynamic parameter used by MLFF module 304 computed so as to optimize the PRC of the model against the additional overhead of the device 308 pushing additional data to the cloud (and also generating additional logging of data on the router).

In another embodiment, MLFF module 304 may push the inference task, and the corresponding prediction model, to a specific device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/device 308 are sufficient to feed the local model.

Thus, in some cases, the techniques herein support centralized model training (e.g., in the cloud), combined with the ability to perform local (on-premise) inference based on the required sampling frequency, local resources available on the device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting (e.g., according to the QoS policy). If the bandwidth available for the telemetry used for the inference of the model exceeds the capacity, MLFF module 304 may decide to activate a local inference by pushing a prediction model to one or more of devices 308.

In yet another embodiment, MLFF module 304 may take a mixed approach whereby some of devices 308 perform the inferences locally, while others rely on supervisory service 310 to perform the predictions.

A further embodiment of the techniques herein introduces a feedback mechanism whereby feedback regarding the predictions by a trained model is provided to model retraining module 306. In cases in which the model is executed on device 308, the device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by supervisory service 310, model retraining module 306 may similarly receive feedback from devices 308 regarding the predictions. For example, once a model M predicts the failure of a tunnel at a given time, MLFF module 304 may send a notification to the affected device 308 indicating the (list of) tunnel(s) for which a failure is predicted, along with the predicted time for the failure, and other parameters such as the failure probability $P_f$ (which can be a simple flag, a categorical variable (low, medium, high) or a real number). The device 308 may use $P_f$ to determine the appropriate action, such as pro-actively rerouting the traffic that would be affected by the failure onto a backup tunnel. In one embodiment, the predicted failure may be signaled to the device 308 using a unicast message for one or more tunnels, or a multicast messages signaling a list of predicted failure to a set of devices 308.

Regardless of how model retraining module 306 receives its feedback, either from the device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4A:
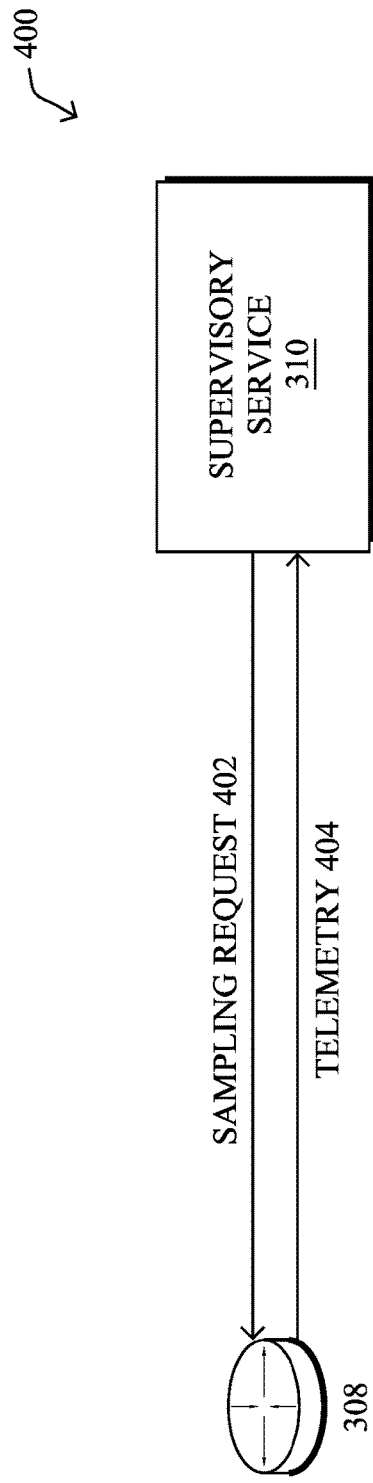
FIGS. 4A-4C illustrate examples of feedback for failure predictions.
Figure 4B:
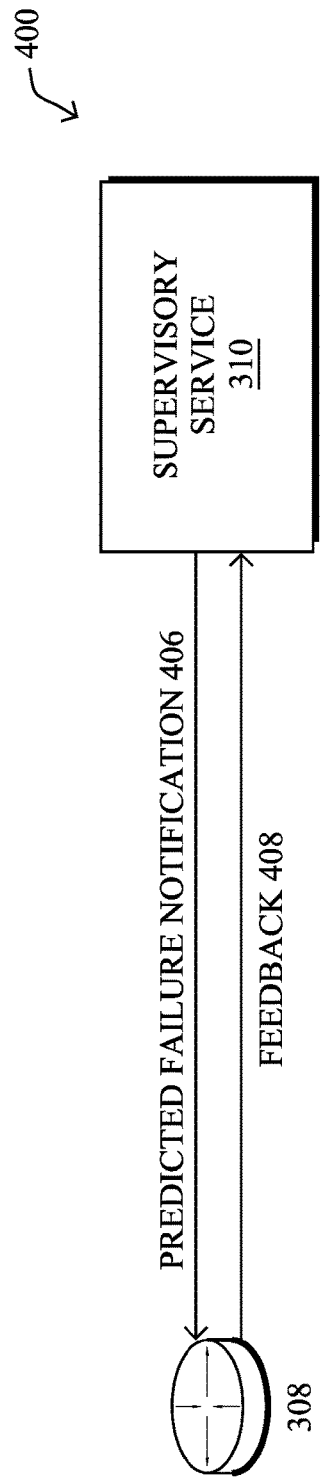
Figure 4C:
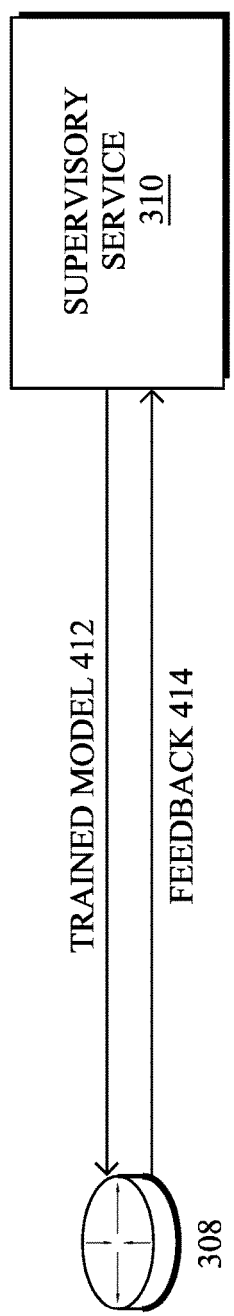

FIGS. 4A-4C illustrate examples of feedback for failure predictions, in various embodiments. As shown in example implementation 400 in FIGS. 4A-4B, assume that the trained model is executed in the cloud by supervisory service. In such a case, supervisory service 310 may send a sampling request 402 to a device 308 that indicates the telemetry variables to sample and report, as well as the determined sampling/reporting period(s) for those variables. In turn, device 308 may report the requested telemetry 404 to supervisory service 310 for analysis. For example, supervisory service 310 may request that device 308 report is CPU load every minute to supervisory service 310, to predict whether the tunnel associated with device 308 is predicted to fail. More specifically, supervisory service 310 may use telemetry 404 as input to its trained prediction model, to determine whether telemetry 404 is indicative of a failure that will occur in the future.

When supervisory service 310 determines that a failure of a network element is predicted, it may send a predicted failure notification 406 to device 308 that identifies the element predicted to fail, the time at which the failure is expected to occur, and potentially the probability of failure, as well. Depending on the timing and probability of failure, device 308 may opt to reroute the affected traffic, or a portion thereof. In turn, device 308 may monitor the element predicted to fail and provide feedback 408 to supervisory service 310 indicating whether the element actually failed and, if so, when. Supervisory service 310 can then use feedback 408 to determine whether model retraining should be initiated, such as by training a more granular model for the SD-WAN instance or the specific tunnel or path under scrutiny.

FIG. 4C illustrates an alternate implementation 410 in which supervisory service 310 pushes the failure prediction model to device 308 for local/on-premise inference. For example, supervisory service 310 may opt for device 308 to perform the local inferences, such as when model 412 requires too much bandwidth to send the needed telemetry to supervisory service 310 for cloud-based prediction. In turn, device 308 may use the corresponding telemetry measurements as input to trained model 412 and, if a failure is predicted, perform a corrective measure such as proactively rerouting the traffic to one or more other tunnels or other paths. In addition, device 308 may provide feedback 414 to supervisory service 310 that indicates false positives and/or false negatives by the model. For example, if device 308 reroutes traffic away from a element predicted by model 412 to fail, and the tunnel does not actually fail, device 308 may inform supervisory service 310. Supervisory service 310 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, to implement predictive routing, a failure prediction model may be trained centrally (e.g., in the cloud) using training data from any number of different networks. While some embodiments provide for the deployment of the trained failure prediction model to the networking devices for local inference, such as by a CE router at the edge of the network, this does not address the large volume of training data needed to train the failure prediction model in the first place. Indeed, it may be impossible to acquire high-frequency telemetry data samples from large SD-WAN deployments without imposing an unacceptable traffic overhead on the WAN, and computational overhead on the routers.

Machine Learning Driven Data Collection of High-Frequency Network Telemetry for Failure Forecasting The techniques herein enable high-frequency telemetry data collection in a network, while considering the overhead involved in collection and/or the value the data adds to the final failure prediction model. It has been observed in current early field trials that the required volume of data would quickly be unacceptable on the WAN to train such a prediction model, considering the frequency at which data are required in order to have a reliable model for failure forecasting.

Specifically, a supervisory service for one or more networks receives telemetry data samples from a plurality of networking devices in the one or more networks. The service trains a failure prediction model to predict failures in the one or more networks, using a training dataset comprising the received telemetry data samples. The service assesses performance of the failure prediction model. The service trains, based on the assessed performance of the failure prediction model, a machine learning-based classification model to determine whether a networking device should send a particular telemetry data sample to the service. The service sends the machine learning-based classifier to one or more of the plurality of networking devices, to control which telemetry data samples the one or more networking devices send to the supervisory service.

Illustratively, the techniques described herein may be performed by hardware, software, and/or firmware, such as in accordance with the predictive routing process 248, which may include computer executable instructions executed by the processor 220 (or independent processor of interfaces 210) to perform functions relating to the techniques described herein.

Figure 5:
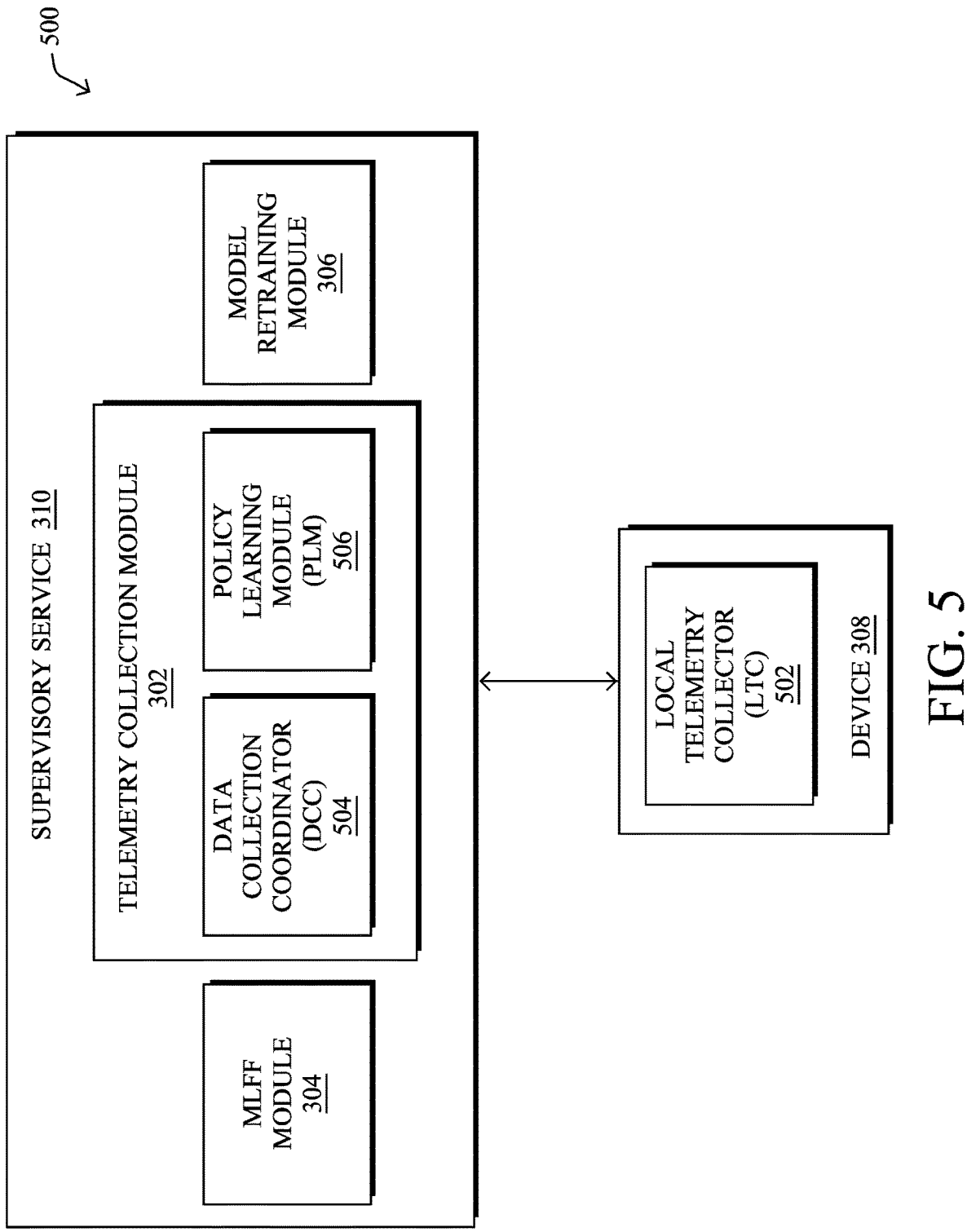
FIG. 5 illustrates an example architecture for the collection of telemetry data.

Operationally, FIG. 5 illustrates an example architecture 500 for the collection of telemetry data, according to various embodiments. Continuing the example of FIG. 3, architecture 500 may include any or all of the components of architecture 300 with the following additions: a local telemetry collector (LTC) 502, a data collection coordinator (DCC) 504, and/or a policy learning module (PLM) 506. As would be appreciated, the various components shown may be combined or omitted, as desired. Further, these components can be executed either locally on a particular device or implemented in a distributed manner, in various cases.

As shown, a first component of architecture 500 is LTC 502 which may be executed by a networking device 308. During execution, LTC 502 may use low-level application programming interfaces (APIs) to the operating system of device 308, to collect network states/telemetry data at potentially very high frequencies (e.g., 1,000 data points per second or higher). Once collected, LTC 502 may cache the collected telemetry data samples in a rotating memory buffer of device 308. In some embodiments, this rotating buffer may employ a first-in first-out (FIFO) policy in order to maintain the memory usage of device 308 to maintain its memory usage below an upper bound, Mem_Max. The value of Mem_Max may vary over time depending on the charge on device 308. In particular, if the total memory of device 308 starts running low, Mem_Max is immediately reduced by LTC 502, or even set to zero.

In another embodiment, LTC 502 may instantiate multiple rotating buffers, one for each time granularity. For example, LTC 502 may have a millisecond level buffer and a centisecond level buffer. The millisecond buffer may hold 1 second worth of data or constrained by some size. When the buffer of device 308 fills up, the data is aggregated as 10 rows (e.g., by taking the mean of each data feature) and added to the centisecond buffer. Of course, other size buffers and/or aggregation approaches may be used, as desired. LTC 502 may also persist periodically part of the data into secondary storage of device 308 so that failures due to a system crash can be recovered. Such telemetry data provides valuable information for predicting system failures.

DCC 504 may be a component of telemetry collection module 302 and is responsible for collecting data from all LTCs 502 co-located with the various devices 308 that supervisory service 310 supervises. For example, DCC 504 may be responsible for configuring LTC 502 of the device 308 shown with the list of telemetry data variables to capture, at which frequencies, and to request that LTC 502 push a copy of its rotating buffer to service 310. In this mode of operation, also referred to as pull mode, LTC 502 reports the telemetry data samples in its buffer to service 310 only after receiving a request to do so from DCC 504. In another embodiment, DCC 504 may also send a push policy to LTC 502, typically based on a simple trigger, so that LTC 502 can proactively report telemetry data samples to service 310. A common example of such policy can be a simple static rule: if a tunnel failure occurs, LTC 502 should immediately send a copy of the buffer to supervisory service 310. Indeed, given the very high imbalance found in such datasets, any positive example needs to be obtained nearly systematically. When the tunnel is up, LTC 502 may send samples to supervisory service 310 at regular time intervals.

In another embodiment, capture and reporting policy for LTC 502 may take the form of a machine learning-based classification model $C_{policy}$ that predicts, given a buffer content $x_{buffer}$, whether the content of the buffer x is valuable enough to warrant sending the telemetry data to supervisory service 310. In other words, LTC 502 may simply perform an inference step of $C_{policy}(x_{buffer})$ and use its outcome to determine whether the telemetry data sample(s) in the buffer of device 308 should be sent to service 310.

As shown, telemetry collection module 302 may also include PLM 506, which is responsible to learn the optimal data collection policies used by DCC 504 to coordinate LTCs 502. First, PLM 506 may perform introspection of MLFF module 304, in order to determine the relevance of various features, thereby determining which telemetry variables can be deactivated the LTCs 502. For example, PLM 506 may request the top telemetry data features at a finer granularity, which may increase the accuracy of the failure prediction model of MLFF module 304. This feature importance can be calculated, for example, as an F1-score or Chi-square-statistic.

Another function of PLM 506 is to train the policy model $C_{policy}$ that DCC 504 sends to LTC 502, to control which telemetry data samples LTC 502 is to send to supervisory service 310. To achieve this, PLM 506 may evaluate the measure of information gain provided by every training example to the failure prediction model of MLFF module 304 and compare this gain with the cost of LTC 502 pushing telemetry data samples to supervisory service 310. Indeed, the initial training of the failure prediction model of MLFF module 304 and/or retraining of the model by model retraining module 306 may incur a heavy cost on the network in terms of traffic on the WAN, the CPU and memory usage of device 308, etc. For example, the information gain may take the form of a Kullback-Leibler divergence or similar measurement.

For every training sample of the training dataset used to train the failure prediction model of MLFF module 304, PLM 506 may decide whether that sample should have been sent (e.g., based on its associated information gain) and train the classification model $C_{policy}$ to predict this decision. Note that, interestingly, the value of a given sample x and its cost to be pushed to service 310 are, more often than not, highly correlated. Indeed, an overloaded networking device is a situation of interest from a modeling perspective, thus making both the measure of information gain and the cost of the corresponding samples simultaneously higher. Conversely, a completely normal state will make samples very cheap to send, but nearly worthless from an information gain standpoint, for the situations where failures are correlated with the WAN and/or routers loads.

In another embodiment, LTC 502 may store high-value buffer contents for a later push to supervisory service 310. When supported, PLM 506 may train a regression model $R_{IG}$, which estimates directly the information gain of samples, which can then be pushed to LTC 502. In doing so, LTC 502 may then store the samples with the highest information gains until conditions are met to push them to service 310.

In a further embodiment, PLM 506 may perform multiple experiments, to find the best granularity for a telemetry data feature/value. Each experiment may, for example, trigger LTM 502 to collect the telemetry data feature (e.g., CPU utilization, memory utilization, etc.) at different granularities. Note that LTM 502 may have policies to stop reporting very fine granular data if the data collection becomes a resource constraint on device 308. PLM 506 may trigger MLFF module 304 to train one failure prediction model for each granularity of the feature. In turn, PLM 506 may then analyze the model accuracy of each model versus the granularity of the telemetry data feature. Based on this analysis, PLM 506 may select optimal granularity at which LTC 502 should collect that feature. For example, PLM 506 may pick a granularity based on several heuristics such as by finding the point where additional granularity does not bring large accuracy improvements to the failure prediction model (e.g., the knee of the curve) and DCC 504 may send an instruction to LTC 502, accordingly.

Note that the telemetry data collection policies may be global (e.g., identical for all networking devices) or on a per-device basis, depending on the model accuracy when performing local inference. For example, assume that device 308 is a new edge router connected to the SD-WAN and locally executes a trained prediction model from MLFF module 304. Now, further assume that device 308 exacerbates different behaviors in terms of failure (e.g., a new type of router, edge connected to a service provider network that has a different SLA, etc.). Using feedback regarding these predictions, PLM 506 may determine that the accuracy of the failure prediction model is particular low and determine that the sampling frequency used by LTC 502 should be increased, when compared to other edge devices in the network. In turn, DCC 504 can then send an instruction to LTC 502 to increase its sampling frequency.

Figure 6:
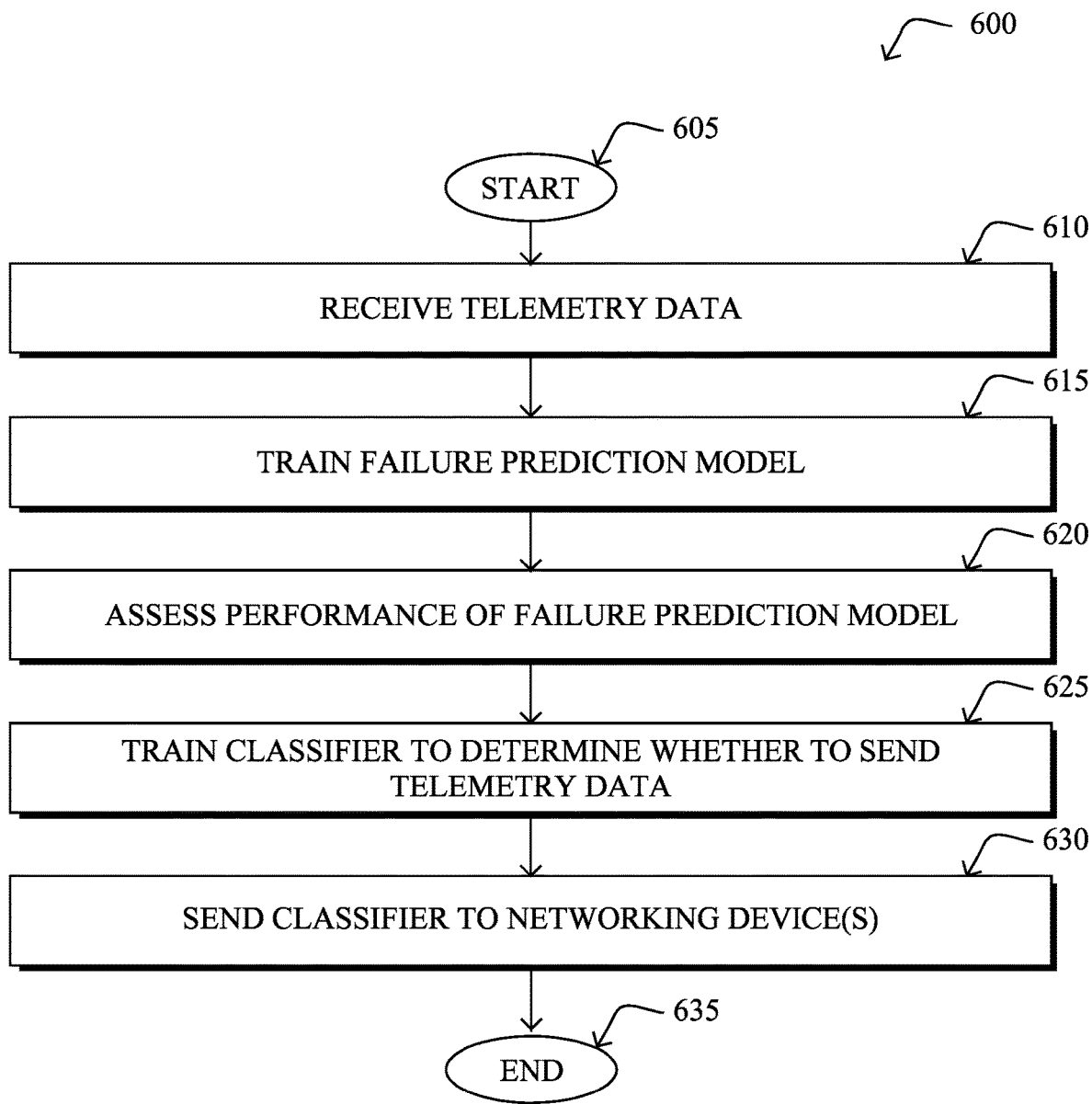
FIG. 6 illustrates an example simplified procedure for the collection of telemetry data for failure prediction in a network.

FIG. 6 illustrates an example simplified procedure for the collection of telemetry data for failure prediction in a network, in accordance with one or more embodiments described herein. For example, a non-generic, specifically configured device (e.g., device 200) may perform procedure 600 by executing stored instructions (e.g., process 248), to provide a supervisory service to one or more networks (e.g., service 310). The procedure 600 my start at step 605 and continue on to step 610 where, as described in greater detail above, the supervisory service may receive telemetry data samples from a plurality of networking devices in the one or more networks. The networking devices may include, for example, one or more edge routers connected to an SD-WAN. The telemetry data samples may include any number of features/values such as, but not limited to, BFD probe metrics (e.g., latency, jitter, etc.), CPU utilization measurements, memory usage measurements, and the like.

At step 615, as detailed above, the supervisory service may train a failure prediction model to predict failures in the one or more networks, using a training dataset comprising the received telemetry data samples. For example, the model may be trained to predict the failure of a tunnel, networking device, or link between networking devices in the one or more networks.

At step 620, the supervisory service may assess performance of the failure prediction model, as described in greater detail above. In some embodiments, this assessment may entail obtaining feedback about whether predictions by the model were accurate. In further embodiments, this assessment may entail computing, for each feature of the training dataset, a measure of feature importance to the failure prediction model. Notably, some telemetry data features/values may have more predictive power than others.

At step 625, as detailed above, the service may train, based on the assessed performance of the failure prediction model, a machine learning-based classification model to determine whether a networking device should send a particular telemetry data sample to the service. Indeed, the sending of telemetry data to the service for purposes of failure prediction model (re)training and/or performing centralized failure predictions can be quite costly from a resource standpoint. Such a classifier may configured, for example, to take into account the information gain associated with a feature and the cost of reporting that feature to the service.

At step 630, the service may send the machine learning-based classifier to one or more of the plurality of networking devices, to control which telemetry data samples the one or more networking devices send to the supervisory service. Thus, when the networking device collects a telemetry data sample, it may input the sample to the classifier, to determine whether the device should report the sample to the service. For example, if the sample includes data of low information gain and the cost associated with the sample is high, the device may decide not to send the sample to the service. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow intelligent collection of telemetry data samples from networking devices in a manner that does not impede on the functioning of their network(s).

While there have been shown and described illustrative embodiments that provide for the collection of telemetry data to implement predictive routing in a network, it is to be understood that various other adaptations and modifications may be made within the spirit and scope of the embodiments herein. For example, while certain embodiments are described herein with respect to using certain models for purposes of predicting failures, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a supervisory service for one or more networks, telemetry data samples from a plurality of networking devices in the one or more networks;
training, by the service, a failure prediction model to predict failures in the one or more networks, using a training dataset comprising the received telemetry data samples;
assessing, by the service, performance of the failure prediction model;
training, by the service and based on the assessed performance of the failure prediction model, a machine learning-based classification model to determine whether a networking device should send a particular telemetry data sample to the service; and
sending, by the service, the machine learning-based classification model to one or more of the plurality of networking devices, to control which telemetry data samples the one or more networking devices send to the supervisory service.

2. The method as in claim 1, wherein assessing performance of the failure prediction model comprises:
computing, for each feature of the training dataset, a measure of feature importance to the failure prediction model.

3. The method as in claim 2, further comprising:
instructing, by the service, a particular one of the plurality of networking devices to stop reporting a particular feature to the supervisory service, based on its associated measure of feature importance to the failure prediction model.

4. The method as in claim 1, further comprising:
determining, for each of the telemetry data samples of the training dataset, a measure of information gain that it provides to the failure prediction model.

5. The method as in claim 4, wherein the machine learning-based classification model is trained to determine whether a networking device should send a particular telemetry data sample to the service, based on a predicted measure of information gain of the particular telemetry data sample.

6. The method as in claim 5, wherein the machine learning-based classification model is trained to determine whether a networking device should send a particular telemetry data sample to the service, based further on a predicted resource cost of sending the particular telemetry data sample to the service.

7. The method as in claim 1, further comprising:
training a plurality of failure prediction models to predict failures in the one or more networks, using telemetry data collected by the networking devices at different granularities;
comparing accuracies of the plurality of failure prediction models, to determine a granularity for telemetry data collection by the networking devices; and
instructing one or more of the networking devices to collect telemetry data at the determined granularity.

8. The method as in claim 1, wherein assessing performance of the failure prediction model comprises:
deploying the failure prediction model to a particular one of the networking devices; and
receiving feedback regarding whether the deployed model correctly predicted failures.

9. The method as in claim 8, further comprising:
instructing the particular networking device to increase its telemetry data sampling frequency, when the feedback indicates that the deployed model is inaccurate on the particular networking device.

10. The method as in claim 1, wherein the plurality of networking devices comprise an edge router connected to a software-defined wide area network (SD-WAN).

11. An apparatus, comprising:
one or more network interfaces to communicate with one or more networks;
a processor coupled to the network interfaces and configured to execute one or more processes; and
a memory configured to store a process executable by the processor, the process when executed configured to:
receive telemetry data samples from a plurality of networking devices in the one or more networks;
train a failure prediction model to predict failures in the one or more networks, using a training dataset comprising the received telemetry data samples;
assess performance of the failure prediction model;
train, based on the assessed performance of the failure prediction model, a machine learning-based classification model to determine whether a networking device should send a particular telemetry data sample to the apparatus; and
send the machine learning-based classification model to one or more of the plurality of networking devices, to control which telemetry data samples the one or more networking devices send to the apparatus.

12. The apparatus as in claim 11, wherein the apparatus assesses performance of the failure prediction model by:
computing, for each feature of the training dataset, a measure of feature importance to the failure prediction model.

13. The apparatus as in claim 12, wherein the process when executed is further configured to:
instruct a particular one of the plurality of networking devices to stop reporting a particular feature to the apparatus, based on its associated measure of feature importance to the failure prediction model.

14. The apparatus as in claim 11, wherein the process when executed is further configured to:
determine, for each of the telemetry data samples of the training dataset, a measure of information gain that it provides to the failure prediction model.

15. The apparatus as in claim 14, wherein the machine learning-based classification model is trained to determine whether a networking device should send a particular telemetry data sample to the apparatus, based on a predicted measure of information gain of the particular telemetry data sample.

16. The apparatus as in claim 15, wherein the machine learning-based classification model is trained to determine whether a networking device should send a particular telemetry data sample to the apparatus, based further on a predicted resource cost of sending the particular telemetry data sample to the apparatus.

17. The apparatus as in claim 11, wherein the process when executed is further configured to:
train a plurality of failure prediction models to predict failures in the one or more networks, using telemetry data collected by the networking devices at different granularities;
compare accuracies of the plurality of failure prediction models, to determine a granularity for telemetry data collection by the networking devices; and
instruct one or more of the networking devices to collect telemetry data at the determined granularity.

18. The apparatus as in claim 11, wherein the apparatus assesses performance of the failure prediction model by:
  deploying the failure prediction model to a particular one of the networking devices; and
  receiving feedback regarding whether the deployed model correctly predicted failures.

19. The apparatus as in claim 18, wherein the process when executed is further configured to:
  instruct the particular networking device to increase its telemetry data sampling frequency, when the feedback indicates that the deployed model is inaccurate on the particular networking device.

20. A tangible, non-transitory, computer-readable medium storing program instructions that cause a supervisory service to execute a process comprising:
  receiving, at a supervisory service for one or more networks, telemetry data samples from a plurality of networking devices in the one or more networks;
  training, by the service, a failure prediction model to predict failures in the one or more networks, using a training dataset comprising the received telemetry data samples;
  assessing, by the service, performance of the failure prediction model;
  training, by the service and based on the assessed performance of the failure prediction model, a machine learning-based classification model to determine whether a networking device should send a particular telemetry data sample to the service; and
  sending, by the service, the machine learning-based classification model to one or more of the plurality of networking devices, to control which telemetry data samples the one or more networking devices send to the supervisory service.

* * * * *